United States Patent
Holmes-Farley et al.

[11] Patent Number: 5,175,027
[45] Date of Patent: Dec. 29, 1992

[54] ULTRA-THIN, UNIFORM SOL-GEL COATINGS

[75] Inventors: Stephen R. Holmes-Farley, Raleigh; Lynn C. Yanyo, Cary, both of N.C.

[73] Assignee: Lord Corporation, Erie, Pa.

[21] Appl. No.: 483,766

[22] Filed: Feb. 23, 1990

[51] Int. Cl.$^5$ .............................................. B05D 3/02
[52] U.S. Cl. .................................. 427/387; 427/388.4; 427/393.5; 427/430.1; 427/435; 428/412; 428/447; 428/450
[58] Field of Search .................. 427/340, 412.1, 388.4, 427/393.5, 430.1, 435, 387, 402, 407.1, 409; 428/412, 447, 450

[56] References Cited

U.S. PATENT DOCUMENTS

| | | | |
|---|---|---|---|
| 3,258,382 | 6/1966 | Vincent | 427/340 X |
| 4,636,440 | 1/1987 | Jada | 427/387 X |
| 4,965,091 | 10/1990 | Fratello et al. | 427/226 X |

*Primary Examiner*—Michael Lusignan
*Attorney, Agent, or Firm*—W. Graham Buie

[57] ABSTRACT

A method of coating a substrate with a uniform, ultra-thin film of a polymer comprising immersing a substrate having active hydrogens on its surface in a solution comprising at least one hydrolyzable metal alkoxide of a polymeric network-forming cation, water, a solvent and a base, said solution having undergone substantially no polymer growth, for a time sufficient to form in situ said film on said substrate, removing and drying said coated substrate.

21 Claims, 1 Drawing Sheet

PRE-TREATMENT AGING TO COATING SOLUTION (MIN)

PRE-TREATMENT AGING TO COATING SOLUTION (MIN)

ULTRA-THIN, UNIFORM SOL-GEL COATINGS

BACKGROUND OF THE INVENTION

This invention relates to an improved method of preparing uniform, ultra-thin coatings on substrates by sol-gel processing and to coated articles prepared thereby.

There is presently a growing need for protecting various substrates against corrosion and other environmental effects by the use of thin films resistant to these effects. The most common methods of applying such protective films to substrates has been by chemical vapor deposition (CVD), plasma enhanced chemical vapor deposition (PECVD), sputtering and thermal oxidation. All have disadvantages, especially with regard to the low temperature preparation of dielectric films.

Another method for applying thin protective coatings to a variety of substrates is known as sol-gel processing. Sol-gel processing is a method whereby small molecules can be converted into polymeric or ceramic materials. Depending on the nature of the monomers one can form anything between organic polymers such as polydimethylsiloxane and inorganic ceramics such as silicon dioxide. Typically one mixes metal alkoxides of network forming cations, e.g., Si, Al, B, Ti, P, in an appropriate solvent such as an alcohol with water and a catalyst. In the catalyzed solution the alkoxides are partially or completely hydrolyzed and then polymerized to form molecules of a glass-like oxide or ceramic network linked by bridging oxygen atoms. The overall process that takes place using tetraethoxysilicon as the metal alkoxide involves two main reactions. The first is the hydrolysis of the alkoxide to form the hydroxy-containing species (e.g. 1).

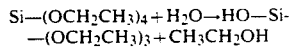
Si—(OCH$_2$CH$_3$)$_4$ + H$_2$O → HO—Si-
—(OCH$_2$CH$_3$)$_3$ + CH$_3$CH$_2$OH This reaction can be repeated, depending upon the conditions, until all of the alkoxide groups have been replaced.

The second reaction is the condensation of the hydroxy-containing species to form metal-oxygen-metal bonds (eq 2).

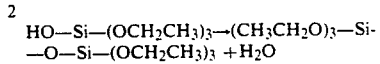
2
HO—Si—(OCH$_2$CH$_3$)$_3$ → (CH$_3$CH$_2$O)$_3$—Si-
—O—Si—(OCH$_2$CH$_3$)$_3$ + H$_2$O This reaction can proceed until all of the hydroxide groups have been used up, resulting in a network of ceramic-type bonds (eq 3).

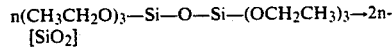
n(CH$_3$CH$_2$O)$_3$—Si—O—Si—(OCH$_2$CH$_3$)$_3$ → 2n-
[SiO$_2$]

The chemistry of sol-gel processing is well documented in the prior art. See, e.g., (1) Brinker et al, "Sol-gel Transition in Simple Silicates", J. Non-Cryst. Solids, 48 (1982) 47–64; (2) Brinker et al, "Sol-gel Transition in Simple Silicates II", J. Non-Cryst. Solids, 63 (1984) 45–59; (3) Schaefer et al, "Characterization of Polymers and Gels by Intermediate Angle X-ray Scattering", presented at the International Union of Pure and Applied Chemists MACRO'82, Amherst, Mass., Jul. 12, 1982; (4) Pettit et al, Sol-Gel Protective Coatings for Black Chrome Solar Selective Films, SPIE Vol. 324, Optical Coatings for Energy Efficiency and Solar Applications (pub. by the Society of Photo-Optical Instrumentation Engineers, Bellingham, Wash.) (1982) 176–183; (5) Brinker et al, "Relationships Between the Sol to Gel and Gel to Glass Conversions", Proceedings of the International Conference on Ultrastructure Processing of Ceramics, Glasses, and Composites, (John Wiley and Sons, N.Y.) (1984); (6) Brinker et al, "Conversion of Monolithic Gels to Glasses in a Multicomponent Silicate Glass Sytem", J. Materials Sci., 16 (1981) 1980–1988; (7) Brinker et al, "A Comparison Between the Densification Kinetics of Colloidal and Polymeric Silica Gels", Mat. Res. Soc. Symp. Proc. Vol. 32 (1984), 25–32; all of which disclosures are incorporated by reference herein.

One of the drawbacks of these prior art sol-gel processes is that they are not able to provide ultra-thin films of acceptable completeness and uniformity, particularly at average film thicknesses below 500 Å. Consequently, the environmental and corrosion protection provided substrates by the prior art sol-gel coating processes is less than satisfactory.

It is an object of the present invention to coat substrates with an ultra-thin film which is complete and uniform even at thicknesses ranging from 5 to 500 Å.

Yet another object of the invention is to provide synthetic polymer substrates protected against adverse environmental effects by an ultra-thin film.

Another object of the invention is to provide corrosion-resistant surfaces coated with an ultra-thin film that is invisible to the naked eye.

SUMMARY OF THE INVENTION

These and other objects of the invention are obtained by immersing a substrate having active hydrogens on its surface in a solution comprising at least one hydrolyzable metal alkoxide of a polymeric network-forming cation, water, a solvent and a base, said solution having undergone substantially no polymer growth, for a time sufficient to form in situ a uniform, ultra-thin film of said polymer and removing and drying the thus coated substrate.

It is important to appreciate that the method of the invention differs from prior art sol-gel processes in that in the latter the coating composition is permitted to complete a certain polymer growth stage, short of gellation before it is applied. In contrast, the method of the invention involves immersing the substrate in the defined coating composition before it has undergone any substantial reaction or growth. This is conveniently accomplished by simply immersing the substrate immediately after the components of the coating composition are mixed. Alternatively, if convenient mixing means are available, the coating composition can be formulated while in the presence of the substrate.

The result is a surprisingly complete and uniform coating that is invisible to the unaided eye and has few discernible features other than those of the substrate in scanning electron microscopy at 10,000 to 100,000 X. Under typical reaction conditions it takes less than 30 minutes for the coating to reach its maximum thickness of about 400 to 700 Å as determined by ellipsometry. Also, it has been surprisingly found that the ability of the coating to provide environmental resistance, e.g., to prevent corrosion of the underlying substrate does not seem to be directly related to the thickness of the coating. Normally, maximum corrosion protection is unexpectedly reached when the coating is significantly less than 100 Å thick. Without being bound to the hypothesis, it is believed that the protection is actually being provided by a reaction layer formed by reaction of the alkoxide and the active hydrogen-containing surface of the substrate. For example, where the metal alkoxide is silicon alkoxide and the substrate aluminum the reaction layer will be aluminosilicate. Further coating material that builds up above this reaction layer provides little additional corrosion protection. This hypothesis is supported by data obtained by corrosion testing of samples with multiple coatings.

The reason why the time between formulating the coating solution and treating the substrate of interest is critical is not known for certain, but it is believed that undue delay between formulation and immersion results in polymer growth, i.e., polymerization of the monomers, into highly branched networks or colloids which are too large to form a continuous film on the surface to be coated. Consequently, irregular and permeable coatings exhibiting less than satisfactory environmental resistance are formed. Immersing the substrate to be coated immediately or shortly after formulation of the coating solution, that is, before it has had an opportunity to undergo this polymer growth allows the metal alkoxide monomer or monomers in their more reactive state to undergo reaction with the active hydrogen containing surface of the substrate to be coated and thereby form the uniform, impermeable reaction layer discussed above. While it is preferred that the immersion of the substrate be effected immediately after formulation of the coating solution, brief delay of up to say no more than about ten minutes is permissible depending on the formulation.

Another critical feature of the method of the invention resides in the use of a base as the catalyst for the sol-gel process involved. According to the literature, (see, for example, "Better Ceramics Through Chemistry", Materials Research Society Symposia Proceedings, Vol. 32, 1984; edited by Brinker, C. J.; Clark, D. E.; Ulrich, D. R.) acid catalyzed sol-gel reactions in coating methods are preferred since they lead to polymeric materials that can result in more densely packed, tighter coatings while the base catalyzed reactions lead to more branched networks. Surprisingly, use of acid catalysts in the method of the present invention fails to provide coatings exhibiting significant corrosion protection. As will be demonstrated below, a number of acid catalysts, including hydrogen chloride, acetic acid and others were used in the method of the invention but none of the solutions containing same produced films that gave significant corrosion protection. Again, why the acid catalysts are ineffective in the method of the invention is not entirely understood. Since none of the reactions using acid catalysts in the method of the invention displayed visual evidence of the formation of colloids, it is possible that the condensation is so slow in acid that the hydrolyzed moieties never condense onto the surface of the substrate.

DETAILED DESCRIPTION OF THE INVENTION

Figure 1:
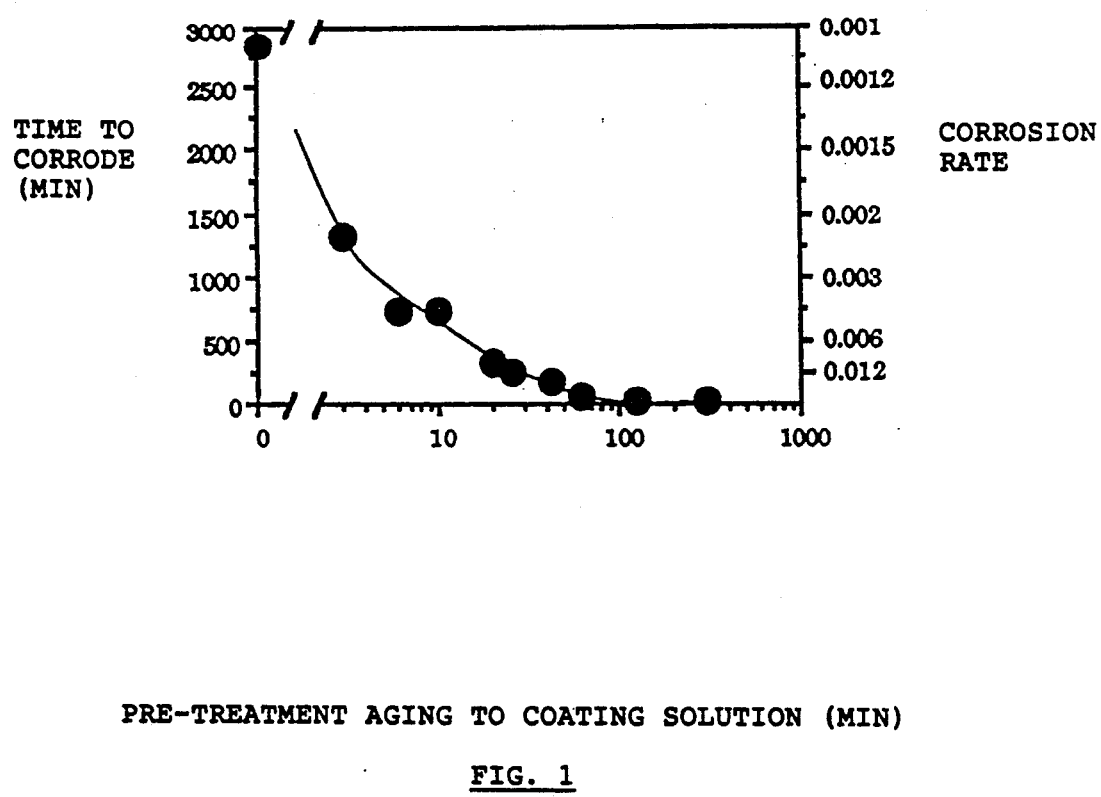
FIG. 1 is a graph of the corrosion rates of protective coatings prepared from the tetraethoxysilane coating solution of Example I, unaged and aged for various time periods.

Illustrative of suitable base catalysts that can be used in the method of the invention are ammonium hydroxide, alkali metal hydroxides such as sodium hydroxide, alkaline earth metal hydroxides such as barium hydroxide and calcium hydroxide and amine bases such as cyclohexylamine. The preferred base catalysts are ammonium hydroxide and equivalent weak bases. The amount of base employed will vary depending upon the particular components selected but will always be present in a catalytic amount. In general, the base will be present in an amount that provides a coating solution having a pH of 7.5–10.0, preferably about 8.5 (as measured by indicator dyes).

The metal alkoxide, solutions of which are employed in the method of the invention, are the hydrolyzable metal alkoxides of a polymeric network-forming cation. Such alkoxides include those of the metals of Group II, III and IV of the Periodic Table, as well as the transition metals and other multivalent (e.g., +3, +4, +5, etc.) metals whose alkoxides form three-dimensional polymeric networks upon hydrolysis. Preferred amongst such metals are silicon, boron, zirconium, titanium, aluminum and other ceramic type materials.

The preferred metal alkoxides of the present invention correspond to the formula:

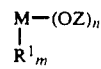

wherein M is a metal as described above; Z is —H or —R or

wherein R is alkyl, preferably of 1 to 15 carbon atoms or aryl, preferably of 6 to 20 carbon atoms; $R^1$ is an organic moiety, preferably an alkyl or aryl of 1 to 25 carbon atoms, unsubstituted or substituted with non-interfering substituents such as amino halo or like groups; n is integer of 1 to 4; and m is 4-n. The metal alkoxides of the present invention can also be di-metaloxy alkoxides such as di-s-butoxyaluminoxytriethoxysilane or di-s-butoxytitanoxytriethoxysilane.

If desired, mixtures of metal alkoxides can also be used to tailor the properties of the coating film to the requirements of the application.

The preferred metal alkoxides are silicon alkoxides such as tetramethoxysilane, tetraethoxysilane, tetrapropoxysilane, tetrabutoxysilane, butyl(triethoxy)silane and the like. Particularly preferred is tetraethoxysilane (TEOS).

The solvents used in the aqueous coating solution of the invention are typically lower alkanols of 1 to 4 carbon atoms, but the choice of solvent is only limited in that it must allow for the coexistance of metal alkoxide, water and base catalyst in a single phase. In all cases, the amount of solvent should be sufficient to solubilize the metal alkoxide monomer or monomers. Typical solvents include ethanol, t-butanol, acetone and methylethylketone.

The presence of water in the coating solution is necessary for the reaction to take place. In most instances, a ratio of water to reactive alkoxide of about 2:1 volume to volume provides acceptable protective coatings.

The substrate that can be treated with the coating solutions can be any substrate that contains active hydrogens on its surface and includes substrates such as metals, metal alloys, ceramics, glasses, plastics and the like. Most metals, for example, will have a surface layer of oxide which in the presence of water provides the hydroxy groups possessing the active hydrogens that ensure reaction with the metal alkoxide monomers. Thus, the invention has particular applicability to the coating of metal substrates such as aluminum, iron, copper and nickel. The metal surfaces can be part of a integral structure or simply a metal layer deposited on a dissimilar substrate. A specific use of the invention, for instance, will be in providing aluminum coated compact discs with a corrosion-resistant protective coating.

Also, many plastic or synthetic polymer substrates which carry or are provided with active hydrogens on their surfaces can be provided protective coatings by the method of the invention. Examples of such polymer substrates are the polyamides, polymethacrylates, polyepoxides and the like. In instances where the substrate is normally inert, that is, does, not contain active hydrogens, the substrate can be provided with same by any of the conventional techniques well known to those skilled in the art. For example, in the case of inert polymers such as polycarbonate, the active hydrogens can be incorporated on its surface by first treating the polycarbonate with an amino group-containing alkoxysilane. Similar techniques for incorporating active hydrogens to other polymer surfaces will readily come to mind to those skilled in the art and are contemplated by the present invention.

Active hydrogens as defined here are hydrogens that can be removed in aqueous base. Typically these are bonded to such elements as oxygen and sulfur. Examples include those found in hydroxyl, thiol, sulfonic acid and carboxylic acid groups. Substrates containing these species under the conditions at which the coating is applied include most ceramics and metals with a surface oxide layer (which, on contact with water, contain surface hydroxyl groups). Typical substrates include aluminum, iron, silicon, titanium dioxide, carbon fibers, glass and paper. Substrates without these species can have them added through state of the art means. This includes the treatment of plastics, such as nylon and polycarbonate, with appropriate agents to generate active hydrogens on the surface.

The composition of the coating solution will vary depending on the particular components selected and the intended application, but will generally comprise about $10^{-4}$ to 30 parts by volume metal alkoxide, 20 to 95 parts by volume solvent, 1 to 60 parts by volume water and $10^{-2}$ to 30 parts by volume of base catalyst.

A preferred formulation comprises 6 parts by volume tetraethoxysilane, 70 parts by volume ethanol, 27 parts by volume water and 3 parts by volume concentrated ammonium hydroxide.

The coating solution is conveniently formulated by diluting the solvent with the water and mixing in the base. The metal alkoxide is then added to the resulting solution and the resulting coating solution vigorously mixed.

Coating of the desired substrate is accomplished by immersing the substrate in the coating solution immediately after formulation or shortly thereafter and allowing the substrate to remain immersed until a coating of desired thickness has formed. The immersion can conveniently be conducted at room temperature but temperatures within the range of 0° to 100° C. can be employed if desired. After a few minutes, the coating solution which is initially clear and colorless turns hazy and starts to color (slightly blue in the case of TEOS). Shortly thereafter the solution becomes white and cloudy. The formation of colloids is presumably responsible for these visual changes. In a typical formulation, the thickness of the coating appears to reach a plateau (about 500–700 Å) after about 30 minutes and continued immersion does not lead to significant increases in thickness. Additional treatments, that is, starting the method over again leads to additional thickness being added at a similar rate, suggesting that the factor that limits the coating thickness is the reaction taking place in solution and not the build-up of material. When corrosion protection is the goal, a single treatment is normally sufficient. As aforementioned, thicknesses beyond 100 Å do not appear to provide additional corrosion protection on aluminum. Multiple coats, however, are advantageous where there is an interest in other properties such as scratch and wear resistance.

It is believed that the uniformity in coating obtained by the present invention is the result of one of two distinct processes, or some combination of the two. Since the treatment solutions clearly form colloids it is possible that the colloids, or some type of pre-colloids, collect on the surface. These colloids would then coalesce into a coating. The resulting coating might then have lumps which would be connected more or less tightly to each other and to the surface. A second mechanism of coating formation involves the reaction of individual monomers, or pre-polymers, with the surface. According to this mechanism, the coating would then seem to "grow" off of the surface as monomers become attached in a mode more resembling a surface initiated reaction than a coating in the usual sense.

Similarly, the reason that these coatings end up being confluent even though they are very thin is not known. One possible explanation is that electrostatics are involved. For example, the pH in the coating solutions is usually below 9 (as measured by indicator dyes) while the point of zero charge of the aluminum substrate is higher. This difference implies that when put into the coating solution the surface of the substrate has a net positive charge. Likewise, the point of zero charge on $SiO_2$ is approximately pH 2. Thus, in the coating solution, the silanol (Si—OH) groups will be largely deprotonated (Si—O—) and will carry a negative charge. Upon immersion of the substrate in the coating solution the reacting silanol groups will thus be electrically attracted to the surface. Such an attraction might be responsible for the confluent coating when otherwise the silanol groups might nucleate in a more random pattern, resulting in a patchy coating.

After coating is completed, the coated substrate is withdrawn and preferably rinsed in solvent and water and then dried. The drying can be effected by air drying or by heating the withdrawn coated substrate as by oven heating. If desired, the dried coated substrate can be baked at temperatures of 50° to 1600° C. to cure the coated film.

The following examples are included to further illustrate the present invention.

EXAMPLE I

Glass microscope slides were cut to convenient sizes (0.5 × 3 cm) and cleaned prior to aluminum evaporation. Cleaning involved scrubbing the surfaces with soap (Liquinox) and water, followed by sonication in soap and water for 15 minutes, rinsing 6 times in distilled water, sonication 10 minutes in acetone (or isopropanol), and drying under a stream of prepurified nitrogen piped through poly(tetrafluoroethylene) tubing. The slides were then immediately put into the vacuum chamber.

Evaporation of aluminum wire (Balzers 99.99%) or iron rod (Balzers 99+%) was carried out at $5 \times 10^{-7}$ to $5 \times 10^{-6}$ torr (the pressure increased slightly during evaporation of aluminum, and significantly during evaporation of iron). Approximately 1000 angstroms was deposited at 5 angstroms per second. The vacuum chamber was then backfilled with hydrocarbon free ultra-high purity oxygen (99.99%; a procedure which took approximately 5 minutes). The slides with evaporated metal mirrors were immediately removed from the chamber with poly(tetrafluoroethylene)-coated tweezers and, within 10 minutes, were immersed in a sol-gel solution prepared as follows:

Ethanol (70 parts by volume) is diluted with water (27 parts by volume) and concentrated ammonium hydroxide (3 parts by volume). Tetraethoxysilane, also known as TEOS (6 parts by volume) is then added and the solution is mixed vigorously for several seconds.

The aluminum coated slides were immersed in this solution immediately after it was formulated and allowed to remain in the solution for one hour, after which it was withdrawn, rinsed briefly with ethanol and water, and oven-baked for one hour at 100° C.

The aluminum/glass slide samples thus-treated were subjected to a corrosion test which comprised exposing the samples to highly corrosive aqueous base and acid-systems. The time required to fully corrode as defined by the disappearance of the metal mirror was noted. The results are reported in Table I below wherein "Rate 1" defines the rate of corrosion for untreated samples to fully corrode.

TABLE 1

| | Environment | | | |
|---|---|---|---|---|
| | 0.1 N NaOH | | 0.5 N HCl | |
| Sample | Time (min) | Rate | Time (h) | Rate |
| Untreated Al | 3 | 1 | 7 | 1 |
| TEOS coating | 4140 | 0.00073 | 1248 | 0.0056 |

As can be seen from the data of Table 1, the untreated aluminum in both corrosive environments corroded at a considerably faster rate than did the coated samples.

EXAMPLE II

The following examples show the importance of the time allowed between formulation of the coating solution and the immersion of the sample.

Aluminum/glass slide samples prepared as described in Example I were immersed in the TEOS coating solution of Example I which were allowed to age for various periods of time before insertion of the sample. Each sample was immersed for one hour rinsed in ethanol and water, withdrawn and allowed to air-dry for four days prior to insertion into 0.1N NaOH. The results are reported in FIG. 1.

FIG. 1 is a graph of the corrosion rates of protective coatings prepared from the TEOS coating solution of Example I, unaged and aged for various time periods. The graph shows that aging of the coating solution is detrimental with a continuous decrease in corrosion inhibition as the delay time increases. Delay times of greater than 60 minutes resulted in negligible corrosion protection.

EXAMPLE III

Aluminum coated glass slide samples prepared as described in Example I were coated as described therein using the TEOS solution of Example I but substituting 3.6 parts by volume of 1N aqueous HCl or acetic acid catalyst for ammonium hydroxide when subjected to the corrosion test of Example I. None of these solutions provided a coating offering significant corrosion protection.

Formation of a coating was also carried out by the procedure recommended by the manufacturer of the silicon alkoxides for the formation of thin coupling-agent coatings. In this procedure, 3 mL of TEOS was dissolved in a solution containing 95 mL ethanol, 5 mL water, and 1 mL acetic acid, with a resulting pH of 4.5. Samples were coated for 2 minutes to 1 hour and rinsed off. Some were then baked for 1 hour at 110° C. None of these samples showed any significant corrosion protection in 0.1N NaOH or 0.5N HCl.

EXAMPLE IV

In order to verify that results obtained on the "pure", evaporated, metal surfaces can be directly related to "real" metal samples, a number of tests were performed on aluminum (2024-T3 alloy) and steel (1010 alloy and GM 16-5) coupons. In addition, the corrosion protection obtained from the coating solutions of the invention identified in Table 2 below was compared to that obtained from state-of-the-art metal finishing treatments. These were done by outside professional metal treatment companies and include anodizing for aluminum and zinc phosphatizing for steel coupons.

Aluminum coupons were treated, weighed, and exposed to acid (1.0N HCl) and base (0.1N NaOH). After exposure for a given period of time, the samples were rinsed in distilled water and weighed again. The mass loss observed during corrosion is then taken as indicative of the corrosion rate.

Steel coupons were treated in a manner similar to the aluminum coupons and exposed to acid (0.1N HCl). Additionally, the steel samples were exposed to distilled water and examined visually for rust. The time taken for rust to first appear is then recorded. Some of the treatments used in this example incorporate the use of two or more silicon alkoxides in a single coating. Some of them also received more than one coating. Unless otherwise specified, the treating solution was identical to that used in Example I with the exception that where multiple alkoxides were used the total volume of alkoxides added remained the same. The treatment time is also indicated.

The results are shown in Table 2 below:

| | Aluminum Samples | |
|---|---|---|
| | Corrosion Rate (mg/min) | |
| Sample | 0.1 N NaOH | 1.0 N HCl |
| Aluminum: | | |
| No Professional Treatment | | |
| Uncoated | 0.7 | 2.8 |

-continued

| Coating: | 0.02 | 0.5 |
|---|---|---|
| TEOS/Octadecyltriethoxysilane: | | |
| (1:1 ratio; 1 day treatment; | | |
| tetrahydrofuran solvent) | | |
| Coating: | 0.03 | 0.6 |
| TEOS/Phenyltriethoxysilane | | (0.5 N) |
| (8:1 ratio: 1 hour treatment) | | |
| Coating: TEOS only | 0.06 | 2.3 |
| (1 hour treatment) | | |
| Two coatings: TEOS only | 0.02 | — |
| (1 day treatment then 90 minute | | |
| treatment) | | |
| Two coatings: TEOS only | 0.008 | — |
| (both treatments for one day) | | |
| Professionally Anodized Aluminum | | |
| Uncoated | 1.6 | — |
| Two coatings: TEOS only | 0.03 | — |
| (both treatments for one day) | | |

Steel Samples

| | Corrosion | |
|---|---|---|
| Sample | 0.1 N HCl (mg/min) | Water (min to rust) |
| GM16-5: No Professional Treatment | | |
| Uncoated | 0.4 | 8 |
| Coating: TEOS only | — | 10 |
| (1 day treatment) | | |
| Coating: TEOS/ | 0.3 | — |
| Phenyltriethoxysilane | | |
| (8:1 ratio, 1 hour treatment) | | |
| Coating: TEOS/ | — | 480 |
| Butyltriethoxysilane | | |
| (1:1 ratio, 1 day treatment) | | |
| Coating: | — | 480 |
| Butyltriethoxysilane only | | |
| (1 day treatment) | | |
| Phosphatized GM16-5 Alloy | | |
| Uncoated | 0.6 | — |
| Two coatings: TEOS only | 0.4 | — |
| (both treatments for 1 day) | | |
| 1010 Alloy: | | |
| No Professional Treatment | | |
| Uncoated | — | 15 |
| Coating: TEOS only | — | 120 |
| (1 day treatment) | | |

As is apparent from the results reported in Table 2, the coating solutions of the invention are very effective at preventing corrosion. In fact, the coating solutions of the invention prove more effective in these environments than the professional metal finishing treatments.

EXAMPLE V

The procedure of Example I was carried out using iron instead of aluminum as the substrate. The iron layer was initially 1000 Å thick. The iron samples were placed in the coating solution used in Example I for 24 hours. The samples were then exposed to a corrosive aqueous solution at pH 4. The time necessary to corrode away the metal layer was recorded in each case.

| Treatment | Time to Corrode | Relative Corrosion Rate |
|---|---|---|
| Uncoated | 6 hours | 1 (by definition) |
| TEOS Coating | 672 hours | 0.009 |

EXAMPLE VI

The procedure of Example I was carried out on aluminum using other alkoxides in addition to silicon alkoxides.

| | Corrosion Rate | |
|---|---|---|
| Metal Akoxides Used | 0.1 N NaOH | 0.5 N HCl |
| None | 1 | 1 (by definition) |
| TEOS Only | 0.001 | 0.006 |
| Zirconium n-propoxide 25% TEOS 75% | 0.002 | 0.005 |
| Zirconium n-propoxide 50% TEOS 50% | 0.002 | 0.01 |
| Zirconium n-propoxide 67% TEOS 33% | 0.08–0.002 | 0.01 |
| Aluminum s-butoxide 25% TEOS 75% | 0.001 | 0.01 |
| Aluminum s-butoxide 50% TEOS 50% | 0.03 | 0.03 |

What is claimed is:

1. A method of coating a substrate with a uniform ultra-thin film comprising immersing a substrate having active hydrogens on its surface in a solution comprising effective film-forming amounts of at least one hydrolyzable metal alkoxide of a polymeric network-forming cation, water, a solvent and a base, said solution having undergone substantially no polymer growth, for a time sufficient to form in situ said film on said substrate, removing and drying said coated substrate.

2. A method according to claim 1 wherein the solution comprises at least one hydrolyzable silicon alkoxide, water, alkanol and ammonium hydroxide.

3. A method according to claim 2 wherein the silicon alkoxide is tetraethoxysilane and the alkanol is ethanol.

4. A method according to claim 1 wherein the metal alkoxide is octadecyltriethoxysilane.

5. A method according to claim 1 wherein the metal alkoxide is phenyltriethoxysilane.

6. A method according to claim 1 wherein the metal alkoxide is butyltriethoxysilane.

7. A method according to claim 1 wherein the pH of the solution is about 7 to 10.

8. A method according to claim 7 wherein the pH of the solution is about 8.5.

9. A method according to claim 1 wherein the immersion period is about 5 minutes to 24 hours.

10. A method of coating a substrate wherein the method of claim 1 is repeated at least once to provide a multiple-coated substrate.

11. A method according to claim 9 wherein the ultra-thin, uniform film has a thickness of about 5–2000 Å.

12. A method according to claim 8 wherein the ultra-thin, uniform film has a thickness of about 5–100 Å.

13. A method of coating a substrate wherein the method of claim 12 is repeated at least once to provide a multiple coated substrate.

14. A method according to claim 1 wherein the substrate is a polycarbonate having active hydrogens on its surface.

15. A method according to claim 1 wherein the substrate is metal having active hydrogens on its surface.

16. A method according to claim 15 wherein the metal is aluminum or iron.

17. A method according to claim 15 wherein the substrate is an aluminum coated compact disc.

18. A method according to claim 15 wherein the metal is an aluminum alloy.

19. A method according to claim 15 wherein the metal is an iron alloy.

20. A method according to claim 14 wherein the polycarbonate is prepared by placing a polycarbonate substrate in an aqueous solution of an amino group-containing alkoxysilane and heating to react said polycarbonate with said silane.

21. A method according to claim 20 where the amino group-containing alkoxysilane is aminopropyltrimethoxysilane.

* * * * *